(12) United States Patent
Wang et al.

(10) Patent No.: US 11,210,544 B2
(45) Date of Patent: Dec. 28, 2021

(54) DISTRIBUTABLE DESCRIPTIVE RECIPE FOR INTELLIGENT IMAGE AND VIDEO PROCESSING SYSTEMS

(71) Applicant: Polarr, Inc., Palo Alto, CA (US)

(72) Inventors: Borui Wang, San Jose, CA (US); Zhen Hua Yan, San Jose, CA (US)

(73) Assignee: Polarr, Inc., Palo Alto, CA (US)

( * ) Notice: Subject to any disclaimer, the term of this patent is extended or adjusted under 35 U.S.C. 154(b) by 77 days.

(21) Appl. No.: 16/885,074

(22) Filed: May 27, 2020

(65) Prior Publication Data

US 2021/0374454 A1 Dec. 2, 2021

(51) Int. Cl.
*G06K 9/34* (2006.01)
*G06T 7/11* (2017.01)
*G06T 11/00* (2006.01)

(52) U.S. Cl.
CPC ............ *G06K 9/342* (2013.01); *G06T 7/11* (2017.01); *G06T 11/001* (2013.01)

(58) Field of Classification Search
CPC .......... G06K 9/342; G06T 7/11; G06T 11/001
See application file for complete search history.

(56) References Cited

U.S. PATENT DOCUMENTS

| | | | |
|---|---|---|---|
| 7,593,561 B2 | 9/2009 | Zhang et al. | |
| 7,730,043 B1 * | 6/2010 | Bourdev | G06T 11/60 707/695 |
| 7,848,555 B2 | 12/2010 | Zhang et al. | |
| 8,045,800 B2 | 10/2011 | Tang et al. | |
| 8,238,660 B2 | 8/2012 | Lin et al. | |
| 8,306,932 B2 | 11/2012 | Saxena et al. | |
| 8,737,739 B2 | 5/2014 | Tang et al. | |
| 9,256,968 B2 | 2/2016 | Berg et al. | |
| 9,269,017 B2 | 2/2016 | Lin et al. | |
| 9,542,626 B2 | 1/2017 | Martinson et al. | |
| 9,811,933 B2 * | 11/2017 | Kokemohr | G06T 5/00 |
| 10,061,491 B2 * | 8/2018 | Muchnick | G06T 11/60 |
| 2016/0225053 A1 | 8/2016 | Romley et al. | |

* cited by examiner

*Primary Examiner* — Phuoc Tran
(74) *Attorney, Agent, or Firm* — Rowan TELS LLC

(57) ABSTRACT

This disclosure relates to a method for rendering images. First, a user request is received from a user interface to access an image effect renderer recipe, comprising conditional logic and non-visual image data, from an effect repository. Next, at least one image signal is received. Objects are identified within the image signal(s). The image effect renderer recipe is processed via an effect renderer recipe interpreter to generate image processing steps and image processing prioritizations. The image processing steps are then ordered in accordance with the image processing prioritizations. Next, an image processor applies the image processing steps to the identified objects of the image signal(s) to generate at least one processed image signal. The processed image signal(s) are then displayed on a display device.

20 Claims, 13 Drawing Sheets

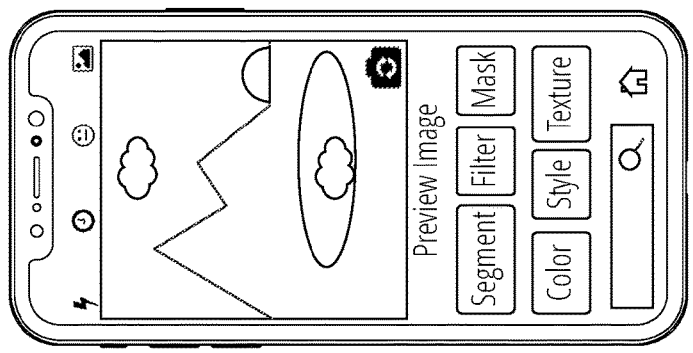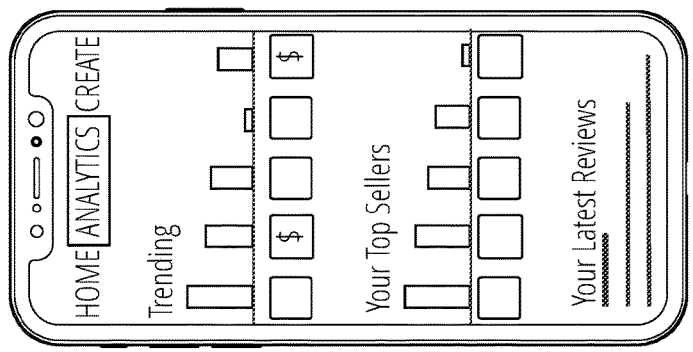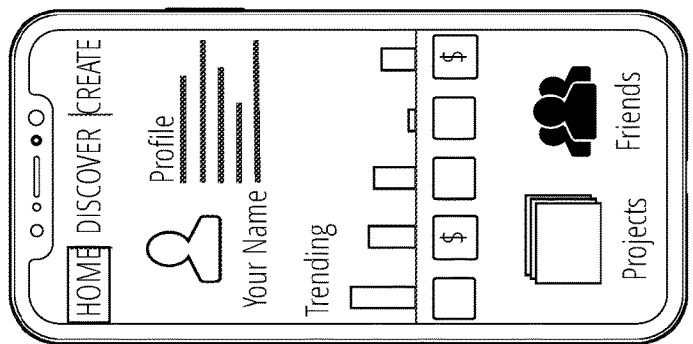
FIG. 8

DISTRIBUTABLE DESCRIPTIVE RECIPE FOR INTELLIGENT IMAGE AND VIDEO PROCESSING SYSTEMS

BACKGROUND

Digital photographic art has become widely popular among both amateurs and professional photographers and graphic designers. Anyone with a smartphone has both a camera to create images and numerous social media outlets on which to share them. Many smartphone and social media platforms offer a number of preset graphical effects that may be used to transform or augment these images.

The aesthetic appeal of a digital photo or video may be enhanced with a variety of different imaging effects, including adjustments/corrections for color, contrast, brightness, and etc., stylistic filters such as grayscale filters, sepia filters, blur filters, etc., as well as enhancement effects such as object linked augmentation effects where a mask or a digital object such as a sticker or frame is added to the digital photo or video for an identified object, and distortion or texture effects that alter the appearance of the identified objects within the digital photo or video. These imaging effects may be applied and viewed in real time by users before capturing a digital photo or recording the digital video.

Graphical artists developing filters may need to meet different parameters for distribution across different platforms and may need to be in contact with numerous entities, such as various social media companies and smartphone manufacturers, in order to distribute their filters to the various platforms.

There is, therefore, a need for a method and system to integrate and streamline the process of effect creation, publication, distribution, and application across multiple hardware and online platforms.

BRIEF SUMMARY

This disclosure relates to a method for rendering images. First, a user request is received from a user interface to access an image effect renderer recipe, comprising conditional logic and non-visual image data, from an effect repository. Next, at least one image signal is received. Objects are identified within the image signal(s). The image effect renderer recipe is processed via an effect renderer recipe interpreter to generate image processing steps and image processing prioritizations. The image processing steps are then ordered in accordance with the image processing prioritizations. Next, an image processor applies the image processing steps to the identified objects of the image signal(s) to generate at least one processed image signal. The processed image signal(s) are then displayed on a display device.

This disclosure further relates to an image rendering system comprising an effect repository, an effect consumer application, a processor, and a memory. The effect repository comprises image effect renderer recipes. The effect consumer application comprises logic allowing a user to access and process the image effect renderer recipes. The memory stores instructions that, when executed by the processor, configure the apparatus to implement the method described above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates effect creator application user interfaces 800 in accordance with one embodiment.

DETAILED DESCRIPTION

The disclosed solution provides an integrated platform for creation and sharing of image effect renderer recipes. These recipes provide instructions by which an initial image may be transformed and augmented to create a final processed image. This solution may allow creators to publish recipes to a wide audience and allow users to access these recipes for use across multiple hardware and online platforms.

Figure 1:
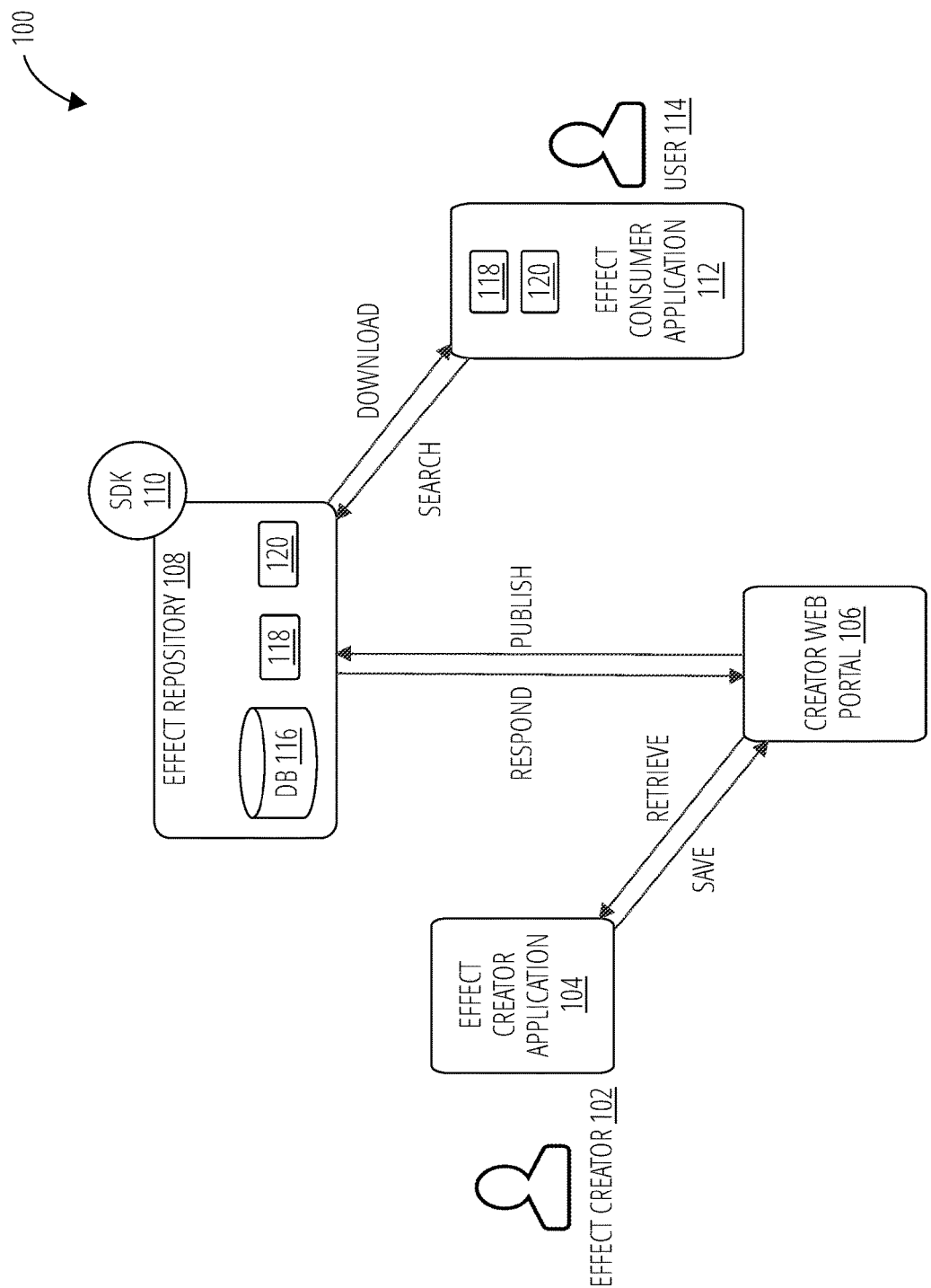
FIG. 1 illustrates an image rendering system 100 in accordance with one embodiment.

FIG. 1 illustrates an image rendering system 100 in accordance with one embodiment. The image rendering system 100 comprises an effect creator 102, an effect creator application 104, a creator web portal 106, an effect repository 108, a software development kit 110, an effect consumer application 112, and a user 114.

An effect creator 102 may access an effect creator application 104, which may be a standalone application that effect creators 102 may use to create and submit new effects. The effect creator application 104 may include rendering capability that allows the effect creator 102 to apply the effects they create to their own images for testing or creative purposes.

Effect creators 102 may submit the effects they've created to the creator web portal 106. The effect creator application 104 may have an interface through which effect creators 102 may save, retrieve, and manage effects available on the creator web portal 106, or effect creators 102 may save, retrieve, and manage effects by accessing the creator web portal 106 through a web browser, a plug in, or by some other means.

Effects saved to the creator web portal 106 may be published to an effect repository 108. The effect repository 108 may be an embeddable module and may include a software development kit 110 that may be available to third parties. The effect repository 108 may include a searchable effect database 116 storing the image effect renderer recipes created by effect creators and published from the creator web portal 106. Recipes published on the effect repository 108 may receive a response that may be communicated back to the effect creator 102 by means of the creator web portal 106 or the effect creator application 104 interface with the creator web portal 106. The response may be in the form of reviews, requests, or monetary compensation.

The effect consumer application 112 may be a standalone application allowing consumers such as the user 114 to discover and download effects available through the effect repository 108 for their own use. The effect consumer application 112 may interact with an image source controlled by the user 114 such as a computer file folder or a smartphone photography app. Through this interaction, a user 114 may apply effects obtained from the effect repository 108 to their own image files. The effect consumer application 112 may also allow the user 114 to respond to the effects they download, which response may be transmitted to the effect repository 108 and communicated back to the effect creator 102 from there. The effect consumer application 112 may include rendering capability that allows the user 114 to create new images with the effects applied.

An effect renderer recipe interpreter 118 may be incorporated into either or both of the effect repository 108 and effect consumer application 112. The effect renderer recipe interpreter 118 may generate image processing steps and image processing prioritizations based on the steps detected in a selected image effect renderer recipe. An image processor 120 may be incorporated into either or both of the effect repository 108 and effect consumer application 112 to process the image processing steps and image processing prioritizations using an image signal provided by the user 114.

Figure 2:
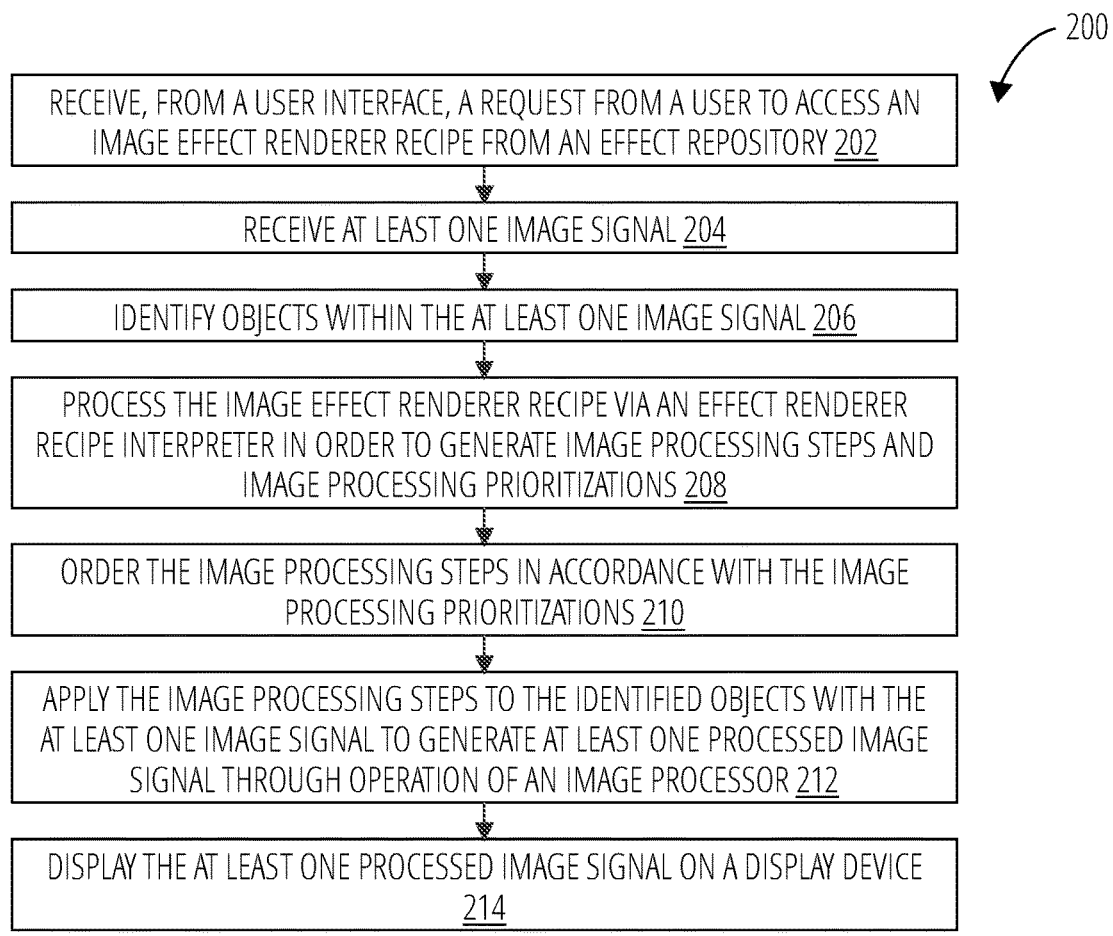
FIG. 2 illustrates a method 200 for rendering images in accordance with one embodiment.

Referring to FIG. 2, in block 202, method 200 of using an image rendering system receives, from a user interface, a request from a user to access an image effect renderer recipe from an effect repository. In block 204, method 200 receives at least one image signal. In block 206, method 200 identifies objects within the at least one image signal. In block 208, method 200 processes the image effect renderer recipe via an effect renderer recipe interpreter in order to generate image processing steps and image processing prioritizations. In block 210, method 200 orders the image processing steps in accordance with the image processing prioritizations. In block 212, method 200 applies the image processing steps to the identified objects with the at least one image signal to generate at least one processed image signal through operation of an image processor. In block 214, method 200 displays the at least one processed image signal on a display device.

Figure 3:
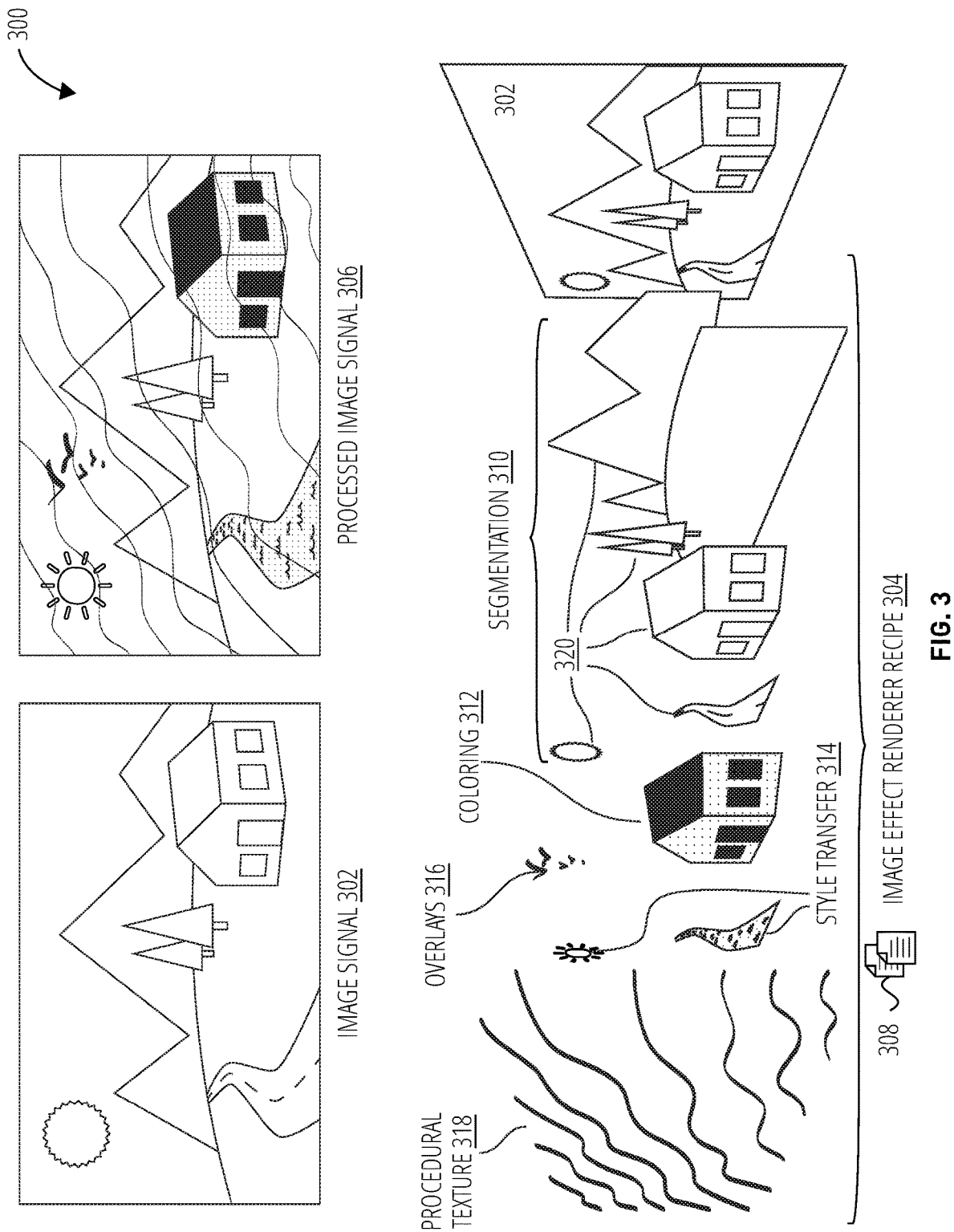
FIG. 3 illustrates an example image effect renderer recipe 300 in accordance with one embodiment.

FIG. 3 illustrates the components of an example image effect renderer recipe 300 in accordance with one embodiment. An image signal 302 may be processed using the various components of an image effect renderer recipe 304 in order to develop a processed image signal 306. The image effect renderer recipe 304 may comprise conditional logic and non-visual image data 308 that, when applied to an image signal, may appear to a user as the visual components illustrated. An image effect renderer recipe 304 may include instructions for segmentation 310, coloring 312, style transfer 314, overlays 316, and procedural texture 318.

Segmentation 310 may be used to divide the image signal into its component objects 320. This may be accomplished through techniques such as object recognition, edge recognition, masking, and other techniques recognized in the field of image processing. FIG. 9 through FIG. 12 provide illustration of how these techniques may be employed through the use of machine learning, specifically by convolutional neural networks, but is not limited thereto. As illustrated here, an image signal 302 capturing a view of mountains and trees, with a sun visible in the sky and a house and road in the foreground, may be segmented into mountains, trees, house, road, and sun.

A coloring 312 effect may be applied to the entire image signal 302 or any of the segmented objects 320. In this example, masking or object detection may be used with a filter or some other transformational technique to apply different coloring effects to the house depicted in the original image signal 302.

Style transfer 314 may be applied to the entire image signal 302 or any of the segmented objects 320. In this example, object recognition may be used to detect that the sun is displayed in the image signal 302, and a stylized image of a sun may be applied to that object, giving the effect of a cartoon sun. The road may be detected as an object, and an effect may be available that transfers a water style when applied, which may give the appearance of turning, in this case, the road, into a body of water.

Overlays 316 may be applied to add visual content not included in the original image signal 302, or to augment portions of the image signal 302. Overlays 316 may include effects like stickers and frames. In this example, an overlay appearing as a flock of birds flying may be added to a region of the image signal 302 recognized as the sky.

Procedural texture 318 may be applied to the entire image signal or any of the segmented objects 320. A procedural texture 318 uses a mathematical algorithm to produce a visual effect across the image signal it is processed with. In this example, a mathematical manipulation used to create a ripple effect may be applied, giving the appearance of waves or ripples across the image.

Once all steps of the image effect renderer recipe 304 have been processed, the processed image signal 306 may appear as illustrated, incorporating both data original to the image signal 302 and data generated by an image processor based on the image effect renderer recipe 304.

Figure 4:
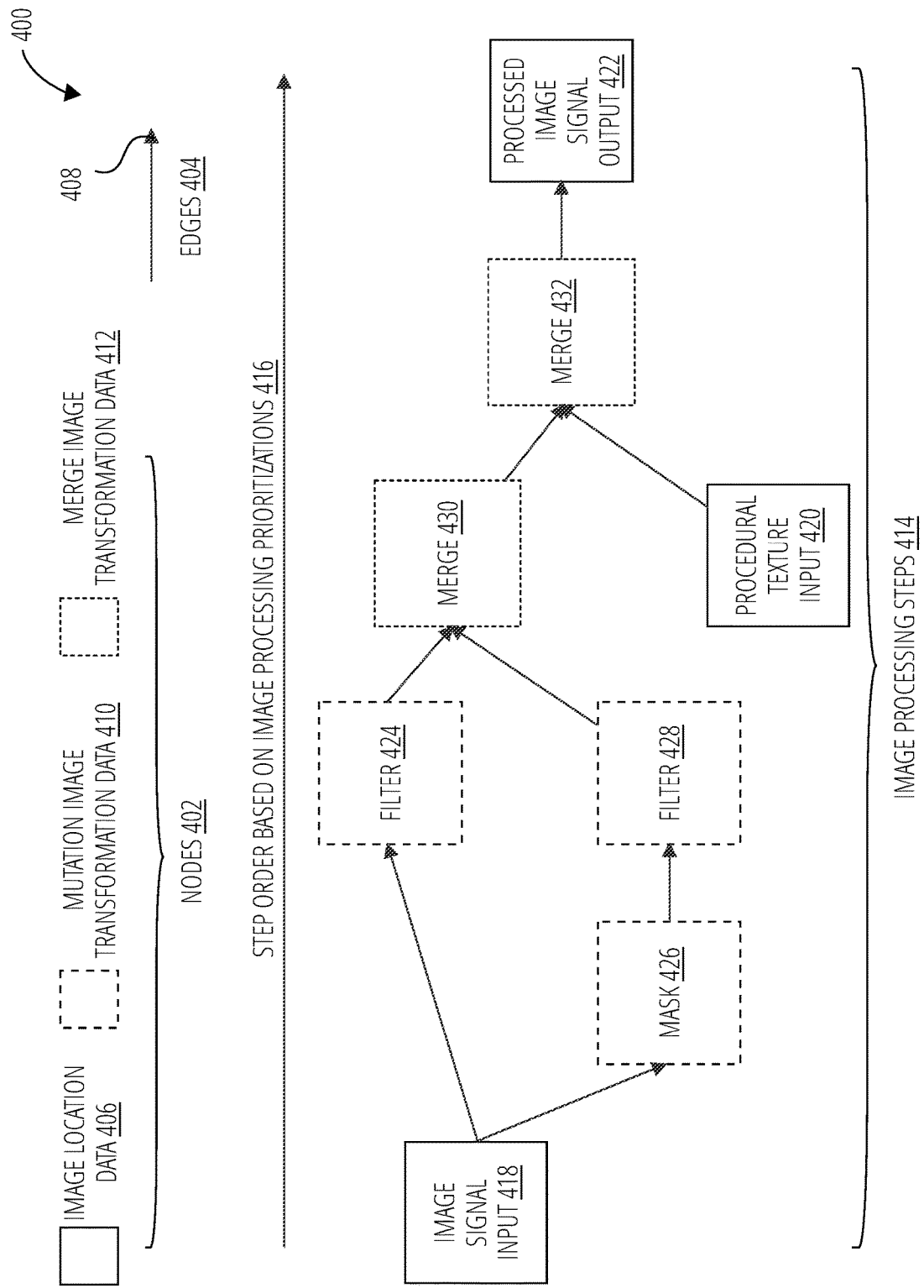
FIG. 4 illustrates a platform-neutral graph 400 in accordance with one embodiment.

FIG. 4 illustrates a platform-neutral graph 400 in accordance with one embodiment. The platform-neutral graph 400 may comprise nodes 402 and edges 404 to represent image processing steps 414 in a format that may be understood and used across multiple hardware and online platforms. Nodes may represent image location data 406 and image transformation data. Edges 404 indicate a directional flow 408 from one node to another, providing an order for performing image processing steps 414.

Image location data 406 may comprise a digitally represented location where the data that makes up an image, a graphical element or object, a procedural texture equation, or some other piece of data to be acted upon, resides and can be accessed for processing. Image transformation data may comprise operational nexuses where a transformation may be performed on the data accessed as input using image location data, such as mutations (mutation image transformation data 410) where a single input may be processed or transformed in some manner to form a single output, and merge image transformation data 412 where multiple inputs may be synthesized to create a single output.

The directional flow 408 assigned to the edges 404 may indicate a step order based on image processing prioritizations 416. Image processing prioritizations may take into account aspects of image processing such as whether an effect may be applied to all or only a portion of the image, and how the effects may interact. For example, a procedural texture may be intended for application across all pixels of an image, including pixels modified from the original by other transformations. Thus, it may be prioritized as the last step, such that all other transformations may be completed and may be acted upon by the procedural texture as part of the overall transformed image signal to develop the final processed image signal.

In the illustrated example, the image signal input location 418 may provide the location of the image signal to be acted upon. Data for a procedural texture to be used in the image effect renderer recipe may be accessed at procedural texture input location 420. These nodes act as inputs to transformational nodes. The end product may be a processed image signal, to be stored at or transmitted to a processed image signal output location 422.

A filter 424, which may be one type of mutation image transformation data 410, may be applied to the data at the image signal input location 418. A mask 426 may also be applied to the original data at the image signal input location 418, and a filter 428 may then be applied to the output of the mask 426 step. The output of filter 424 and filter 428 may be merged at merge 430 to form a single body of transformed data.

The data at procedural texture input location 420 may be merged with the output of merge 430 at merge 432 in order to apply the algorithm located at procedural texture input location 420 to the merged outputs of the transformations. The output of merge 432, in effect a processed image signal with a procedural texture applied, may be sent to the processed image signal output location 422 to be saved or received as a processed image signal output. This output may be displayed on a display device for viewing by a user.

Figure 5:
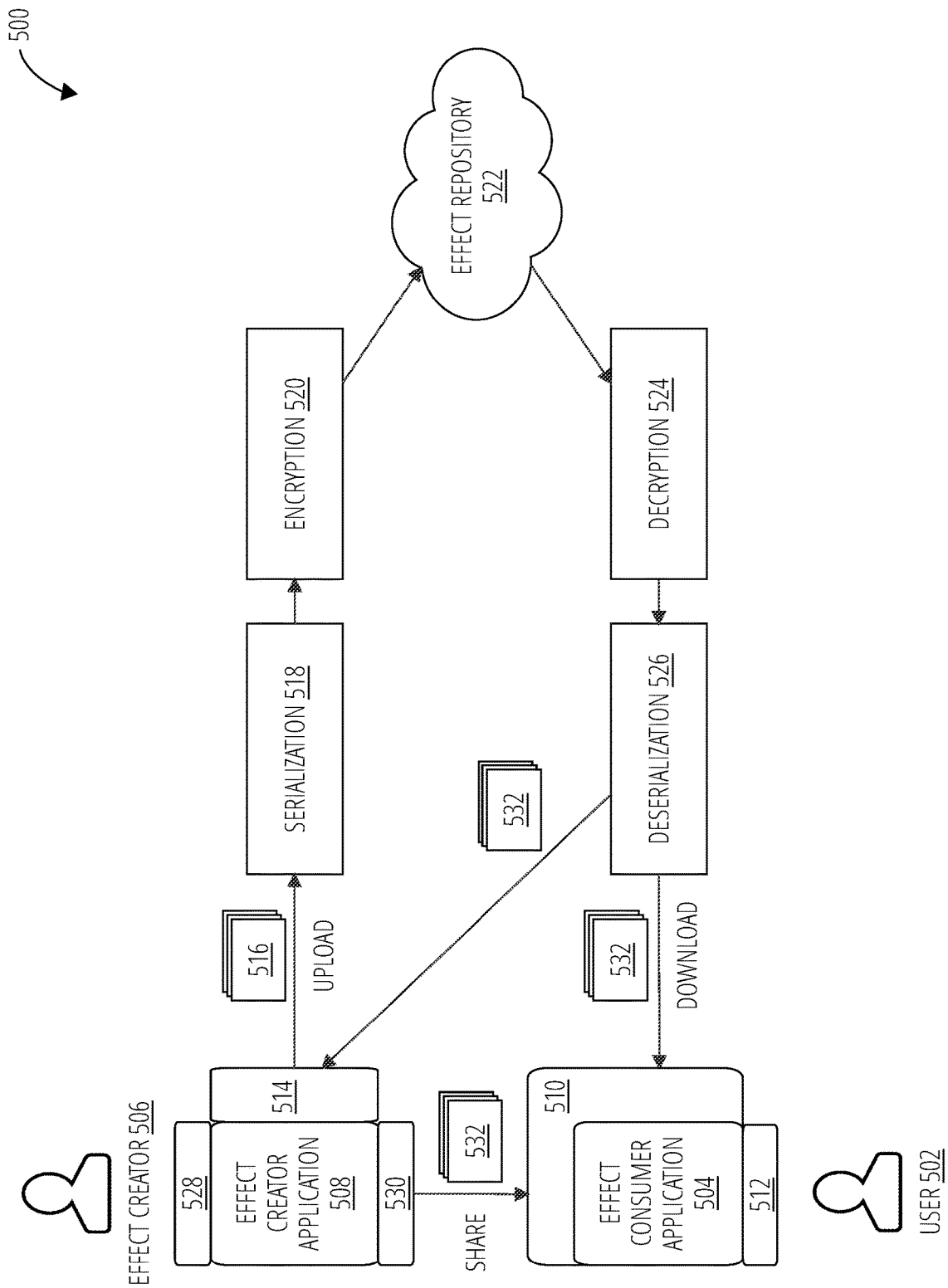
FIG. 5 illustrates sharing image effect renderer recipes 500 in accordance with one embodiment.

FIG. 5 illustrates aspects of sharing image effect renderer recipes 500 in accordance with one embodiment. A user 502 may use an effect consumer application 504 to obtain access to image effect renderer recipes created by an effect creator 506 using an effect creator application 508.

The effect consumer application 504 may incorporate a first logic 510 that allows the user 502 to access image effect renderer recipes 532 and a second logic 512 to process the image effect renderer recipes 532. In some embodiments, the first logic 510 or some other portion of the effect consumer application 504 may incorporate decryption 524 and deserialization 526 capabilities for secure content on the effect repository 522. The user 502 may have a token stored in their installation of the effect consumer application 504 to facilitate decryption 524. In other embodiments, decryption 524 and deserialization 526 may be provided by the effect repository 522 upon receipt of this token from the user's effect consumer application 504 installation, upon entry of a password by the user 502, or some other means of authentication.

The effect creator application 508 may incorporate a third logic 514 that allows the effect creator 506 to upload, serialize, and encrypt creator accessible image effect renderer recipes 516 so that they may be stored securely on the effect repository 522. In some embodiments, serialization 518 and encryption 520 may be implemented in the creator web portal 106 introduced in FIG. 1. The effect creator application 508 may further incorporate a fourth logic 528 to process the creator accessible image effect renderer recipes 516. Additional components of the third logic 514 may incorporate the ability to decrypt and deserialize image effect renderer recipes 532 stored in secure portions of the effect repository 522.

The effect creator application 508 may further comprise a fifth logic 530. This fifth logic 530 may allow the effect creator 506 to publish their creator accessible image effect renderer recipes 516 as image effect renderer recipes 532. This may allow the effect creator 506 to generate image effect renderer recipes 532 that may be shared directly with a user 502 through their effect consumer application 504.

Figure 6:
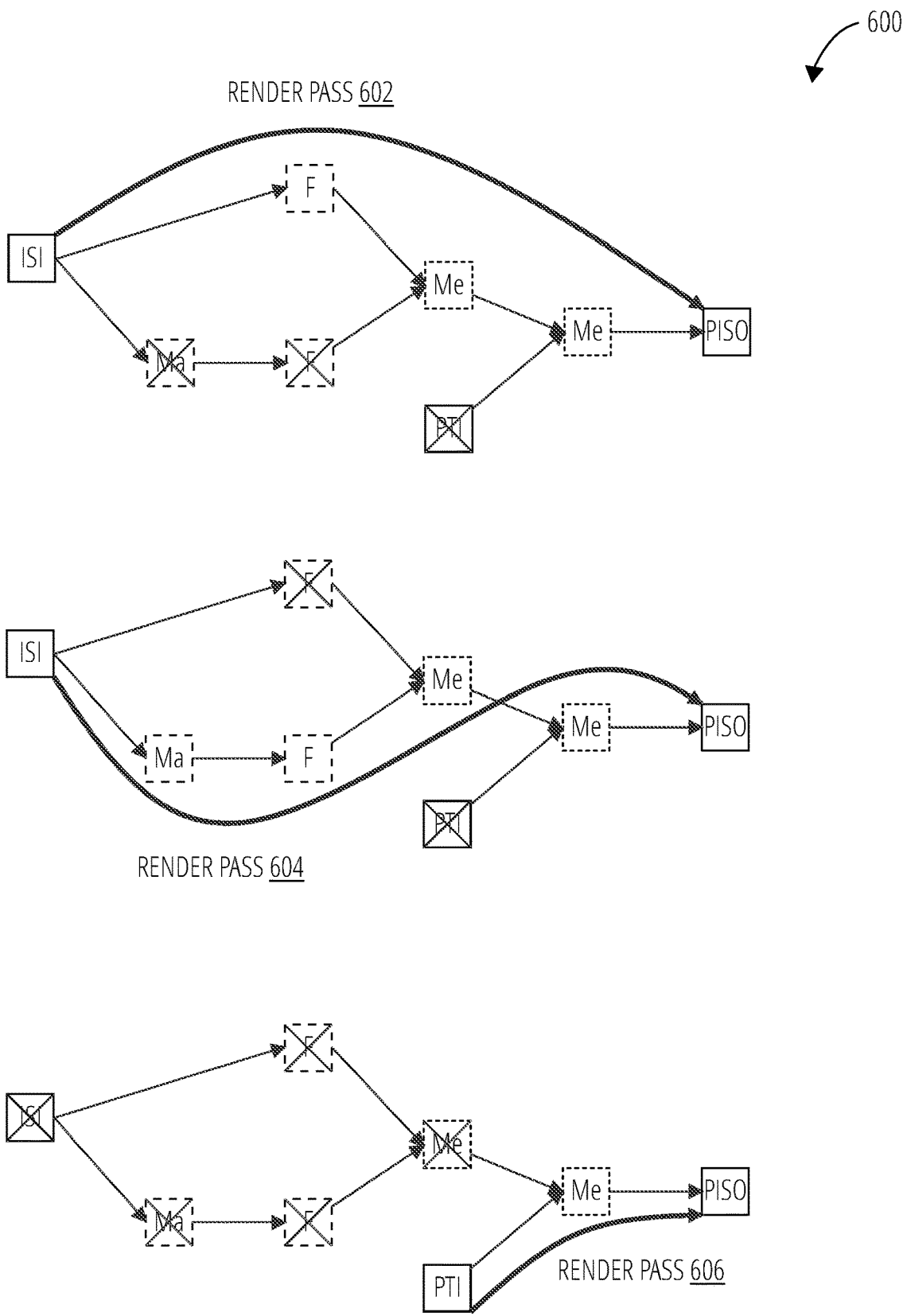
FIG. 6 illustrates render pass order examples 600 in accordance with one embodiment.

FIG. 6 illustrates render pass order examples 600. The render pass order is the order an image processor such as a renderer may complete the steps of an image effect renderer recipe. The platform-neutral graph introduced in FIG. 4 is used as an example to describe the order in which the illustrated render passes, render pass 602, render pass 604, and render pass 606, may be performed. A render pass may follow edges between nodes, beginning with a first set of image location data and ending with a second set of image location data. The render pass may progress in only one direction based on the directional flow of the edges traversed and may not branch or return to a previous node.

Render pass 602, for example, may be the first render pass applied to an image signal input. The render pass 602 may traverse a filter step, then follow the edges through merge steps without action, as merged data may be achieved through the action of successive render passes. The render pass 602 may complete at the processed image signal output node. For the next render pass, the data from the processed image signal output node may be used as the input image signal.

Render pass 604 may first traverse the mask node in order to mask a portion of data in the input image signal from future transformation. Render pass 604 may then traverse the filter node, applying the filter transformation to only unmasked portions of the image signal. Again, the merge nodes may be traversed without action. Render pass 604 may complete at the processed image signal output node. At this time the image signal data will have had one filter applied to all data and a second filter applied only to data not portioned off by the mask. This order may be selected to achieve this specific result. The reverse order may, for certain types of filters, result in a different image signal.

The final render pass 606 may begin with the procedural texture input node and may merge the results of the previous render passes with the textural algorithm. This may act to apply the algorithm to the image signal data after the previous transformations, such that the entire image may appear to have a consistent texture applied throughout. Render pass 606 may then complete at the processed image signal output node. All of the image processing steps may be applied through successive render passes in this manner to obtain a final processed image signal.

Render pass order may be determined in a manner that minimizes loss of the image signal in completing the image processing steps. Determining render pass order may also be performed to minimize the number of render passes needed or using some other criteria.

Figure 7:
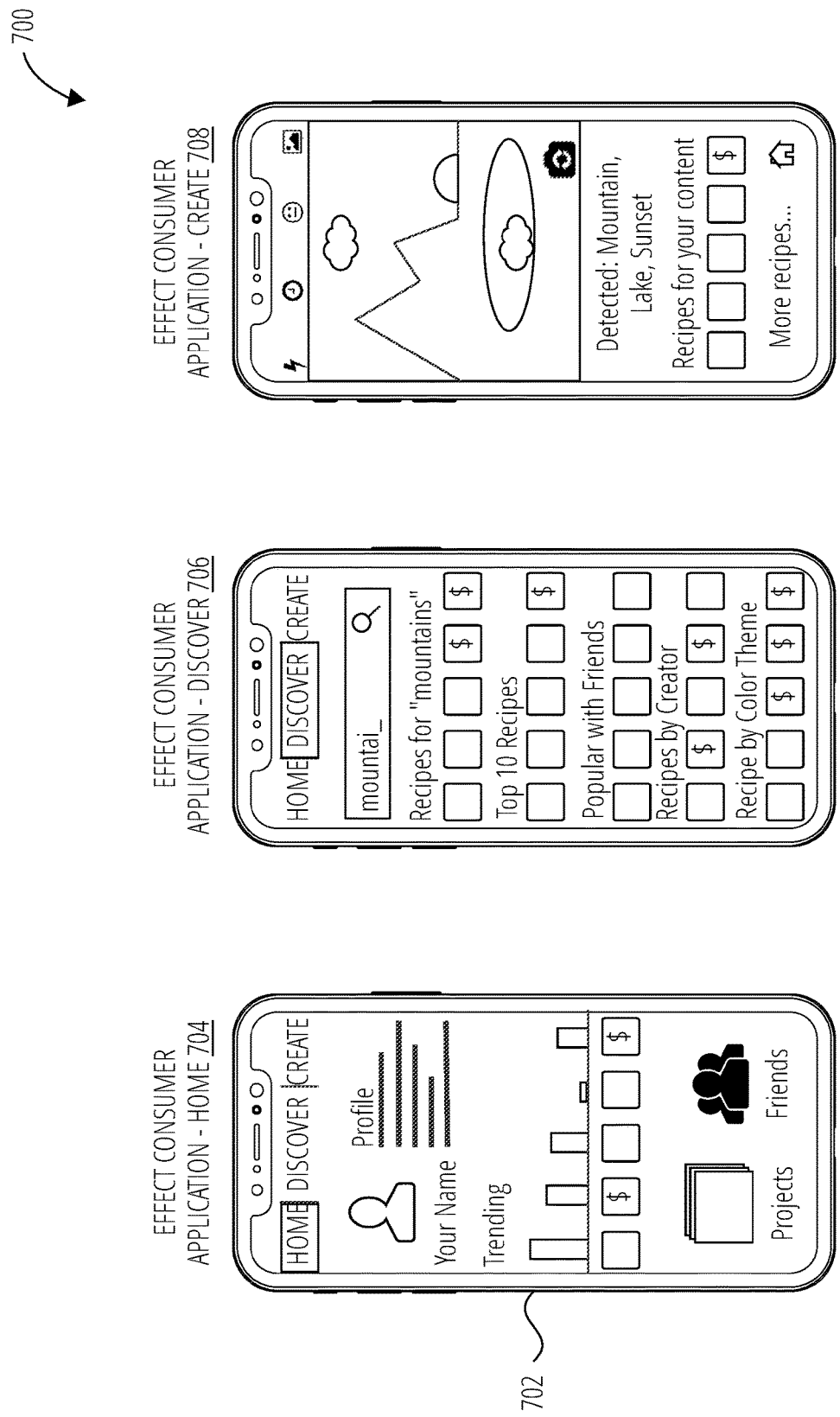
FIG. 7 illustrates effect consumer application user interfaces 700 in accordance with one embodiment.

FIG. 7 illustrates effect consumer application user interfaces 700 in accordance with one embodiment. The effect consumer application user interfaces 700 may be viewed using a display device 702 such as a smartphone or computer monitor, and may comprise an effect consumer application—home 704 view, an effect consumer application—discover 706 view, and an effect consumer application—create 708 view. Other embodiments may implement all, some, or none of these views, in addition to other user interface views not illustrated. The examples shown are not intended to be limiting, either with regard to the view types, their designs, or the features implemented in any given embodiment.

The effect consumer application—home 704 view may provide a user, such as those introduced in FIG. 1 and FIG. 5, with the ability to view and modify a user profile, upload a profile picture, see available image effect renderer recipes that are popular across all or part of a market, access their own saved photographic projects, and view and manage their friends on the application (i.e., other effect consumer application users they have formed a connection with on the application, including effect creators).

The effect consumer application—discover 706 view may allow the user to search the effect database for image effect renderer recipes based on a number of search criteria. These criteria may include complete or partial search terms entered into a search field, relative popularity across the platform or among friends, identity of the creator, category of effect encoded in the image effect renderer recipes, favorites, etc.

The effect consumer application—create 708 view may access a camera incorporated into the display device 702 the user employs to access the effect consumer application. For example, the effect consumer application—create 708 may access a smartphone camera that allows front-facing photography. It may alternately or additionally access volumes of images stored on the smartphone. A preview pane may display the selected stored image, or the image currently targeted in the camera's field of view. A selection of thumbnails representing image effect renderer recipes may be provided and tapping a thumbnail may temporarily apply that image effect renderer recipe to the image in the preview pane. Real time object detection methods may be employed to identify features or objects within the preview pane, and image effect renderer recipes specific to those objects might be suggested. Links may be provided to return to the effect consumer application—home 704 and effect consumer application—discover 706 views.

A save final image button (not shown) may store a processed image signal on the user's display device 702, computer, or a cloud drive associated with the effect consumer application. A save project for later option (not shown) may store the data related to the image in the preview pane to a cloud folder for later access. Other options, such as setting an image as a profile picture or sharing to friends may be incorporated, as well as other functions understood in the art.

FIG. 8 illustrates effect creator application user interfaces 800 in accordance with one embodiment. The effect creator application user interfaces 800 may be viewed using a display device 802 such as a smartphone or computer monitor, and may comprise an effect creator application—home 804 view, an effect creator application—analytics 806 view, and an effect creator application—create 808 view. Other embodiments may implement all, some, or none of these views, in addition to other user interface views not illustrated. The examples shown are not intended to be limiting, either with regard to the view types, their designs, or the features implemented in any given embodiment.

The effect creator application—home 804 view may provide an effect creator such as those introduced in FIG. 1 and FIG. 5, with the ability to view and modify a user profile, upload a profile picture, see image effect renderer recipes and creator accessible image effect renderer recipes that are popular across all or part of a market, access their own saved photographic and image effect renderer recipe projects, and view and manage their friends on the application (i.e., other effect creators and users they have formed a connection with on the application).

The effect creator application—analytics 806 view may provide the effect creator with their trending image effect renderer recipes, their top-selling image effect renderer recipes, reviewer feedback, an in-app balance (not shown), and other information on their work and presence across the platform.

In addition to a creative view similar to that seen by users, such as the effect consumer application—create 708, the effect creator application user interfaces 800 may include an effect creator application—create 808 as illustrated. Controls in this view may offer a selection of sample images and access camera and photo volume applications on the display device 802. This may allow the effect creator to select an image to work with in the preview pane. Icons and search functions may allow the effect creator to select and manipulate different transformative filters and graphical effects to apply to the preview image. Save functions (not shown) may allow the effect creator to save a project for future work, publish it to an effect repository, or share it with friends. Additional features may be incorporated here as understood in the art.

Figure 9:
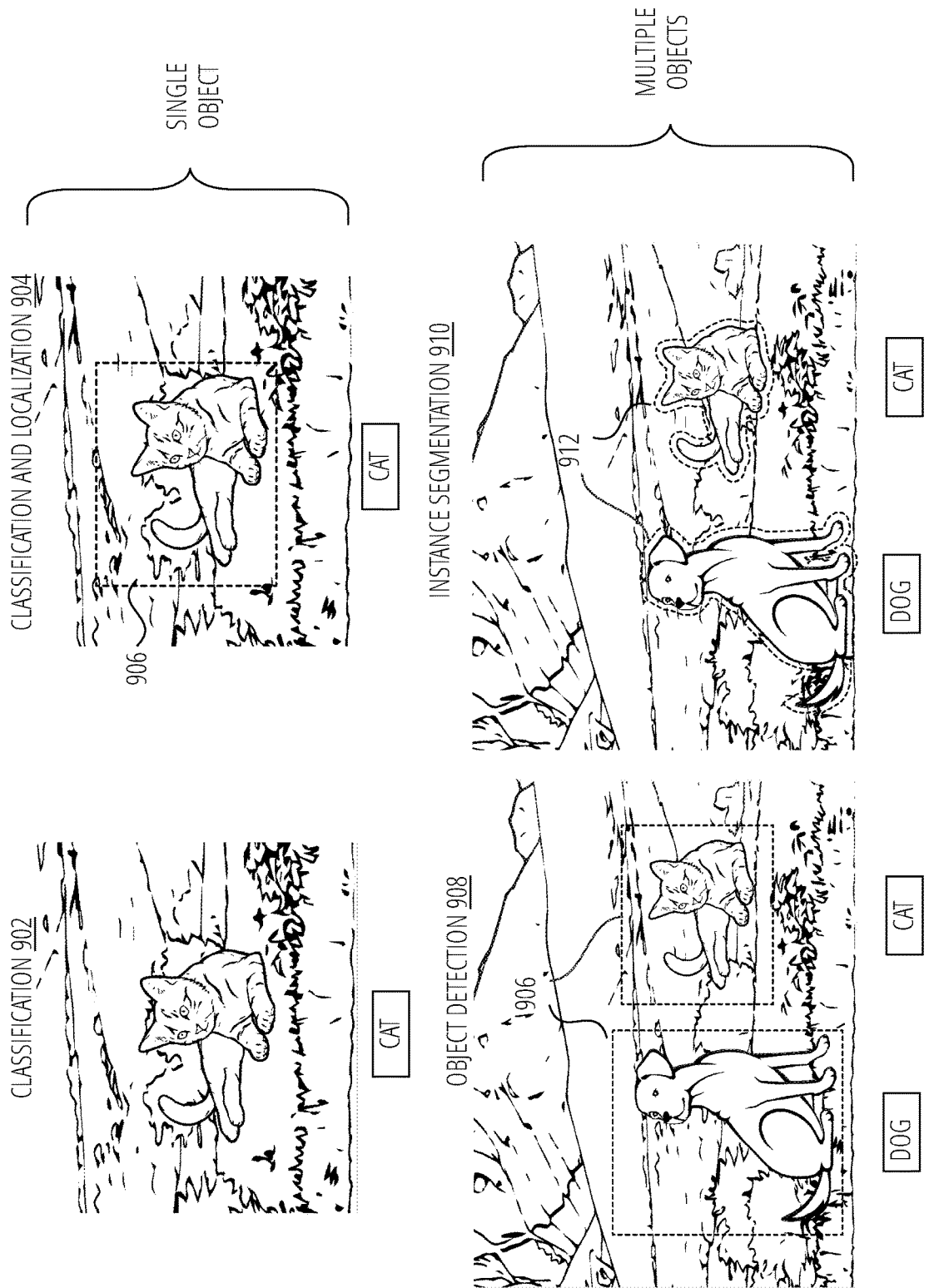
FIG. 9 illustrates a comparison between image classification, object detection, and instance segmentation.

FIG. 9 illustrates a comparison between image classification, object detection, and instance segmentation. When a single object is in an image, the classification model 902 may be utilized to identify what is in the image. For instance, the classification model 902 identifies that a cat is in the image. In addition to the classification model 902, a classification and localization model 904 may be utilized to classify and identify the location of the cat within the image with a bounding box 906. When multiple objects are present within an image, an object detection model 908 may be utilized. The object detection model 908 utilizes bounding boxes to classify and locate the position of the different objects within the image. An instance segmentation model 910 detects each object of an image, its localization and its precise segmentation by pixel with a segmentation region 912.

The Image classification models classify images into a single category, usually corresponding to the most salient object. Photos and videos are usually complex and contain multiple objects. This being said, assigning a label with image classification models may become tricky and uncertain. Object detection models are therefore more appropriate to identify multiple relevant objects in a single image. The second significant advantage of object detection models versus image classification ones is that localization of the objects may be provided.

Some of the model that may be utilized to perform image classification, object detection, and instance segmentation include but are not limited to, Region-based Convolutional Network (R-CNN), Fast Region-based Convolutional Network (Fast R-CNN), Faster Region-based Convolutional Network (Faster R-CNN), Region-based Fully Convolutional Network (R-FCN), You Only Look Once (YOLO), Single-Shot Detector (SSD), Neural Architecture Search Net (NASNet), and Mask Region-based Convolutional Network (Mask R-CNN).

These models may utilize a variety of training datasets that include but are not limited to PASCAL Visual Object Classification (PASCAL VOC) and Common Objects in COntext (COCO) datasets.

The PASCAL Visual Object Classification (PASCAL VOC) dataset is a well-known dataset for object detection, classification, segmentation of objects and so on. There are around 10 000 images for training and validation containing bounding boxes with objects. Although, the PASCAL VOC dataset contains only 20 categories, it is still considered as a reference dataset in the object detection problem.

ImageNet has released an object detection dataset since 2013 with bounding boxes. The training dataset is composed of around 500 000 images only for training and 200 categories.

The Common Objects in COntext (COCO) datasets were developed by Microsoft. This dataset is used for caption generation, object detection, key point detection and object segmentation. The COCO object detection consists in localizing the objects in an image with bounding boxes and categorizing each one of them between 80 categories.

Figure 10:
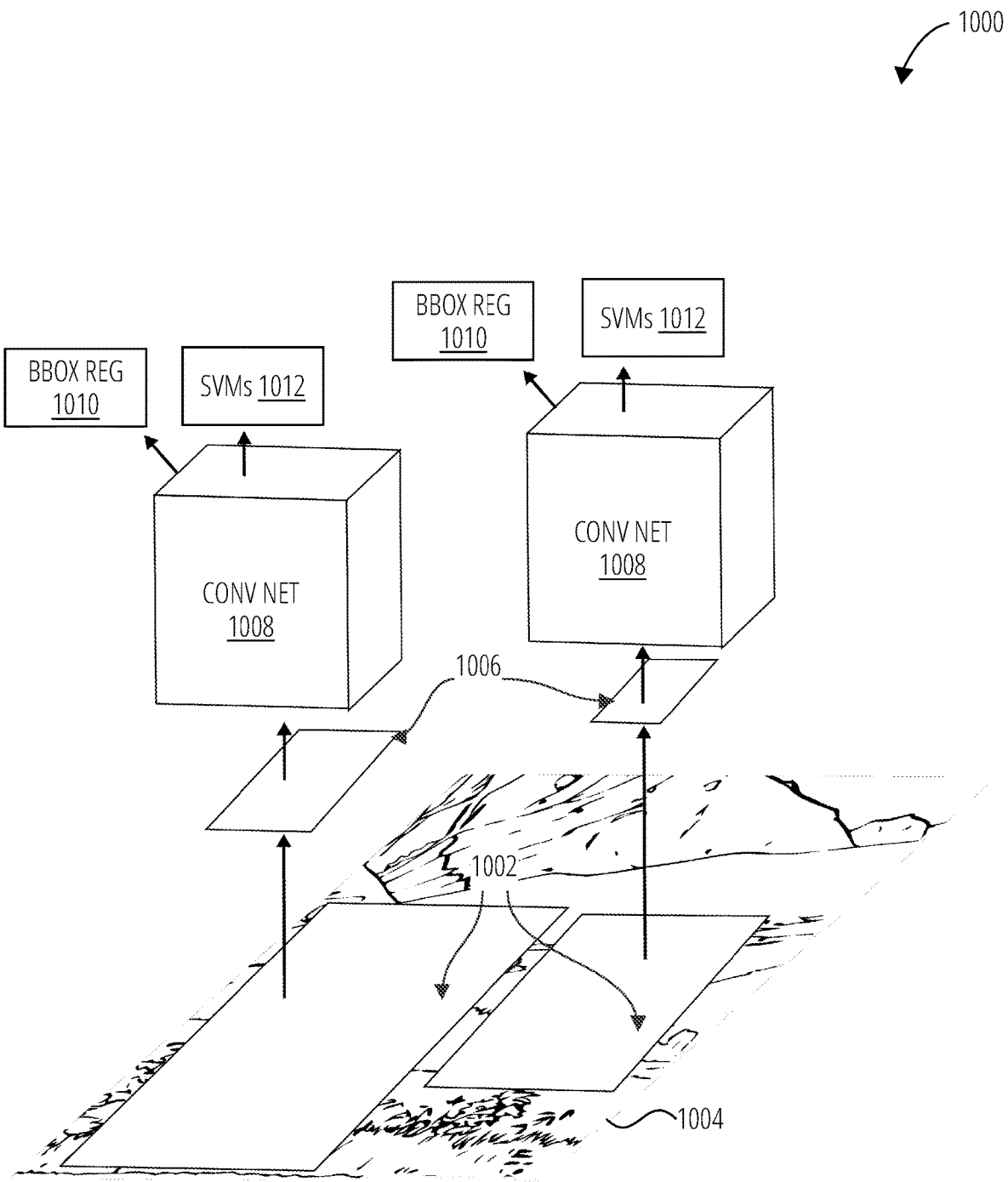
FIG. 10 illustrates a Region-based Convolution Network 1000.

FIG. 10 illustrates an example of a Region-based Convolution Network 1000 (R-CNN). Each region proposal feeds a convolutional neural network (CNN) to extract a features vector, possible objects are detected using multiple SVM classifiers and a linear regressor modifies the coordinates of the bounding box. The regions of interest (ROI 1002) of the input image 1004. Each ROI 1002 of resized/warped creating the warped image region 1006 which are forwarded to the convolutional neural network 1008 where they are feed to the support vector machines 1012 and bounding box linear regressors 1010.

In R-CNN, the selective search method is an alternative to exhaustive search in an image to capture object location. It initializes small regions in an image and merges them with a hierarchical grouping. Thus, the final group is a box containing the entire image. The detected regions are merged according to a variety of color spaces and similarity metrics. The output is a number of region proposals which could contain an object by merging small regions.

The R-CNN model combines the selective search method to detect region proposals and deep learning to find out the object in these regions. Each region proposal is resized to match the input of a CNN from which the method extracts a 4096-dimension vector of features. The features vector is fed into multiple classifiers to produce probabilities to belong to each class. Each one of these classes has a support vector machines 1012 (SVM) classifier trained to infer a probability to detect this object for a given vector of features. This vector also feeds a linear regressor to adapt the shapes of the bounding box for a region proposal and thus reduce localization errors.

The CNN model described is trained on the ImageNet dataset. It is fine-tuned using the region proposals corresponding to an IoU greater than 0.5 with the ground-truth boxes. Two versions are produced, one version is using the PASCAL VOC dataset and the other the ImageNet dataset with bounding boxes. The SVM classifiers are also trained for each class of each dataset.

Figure 11:
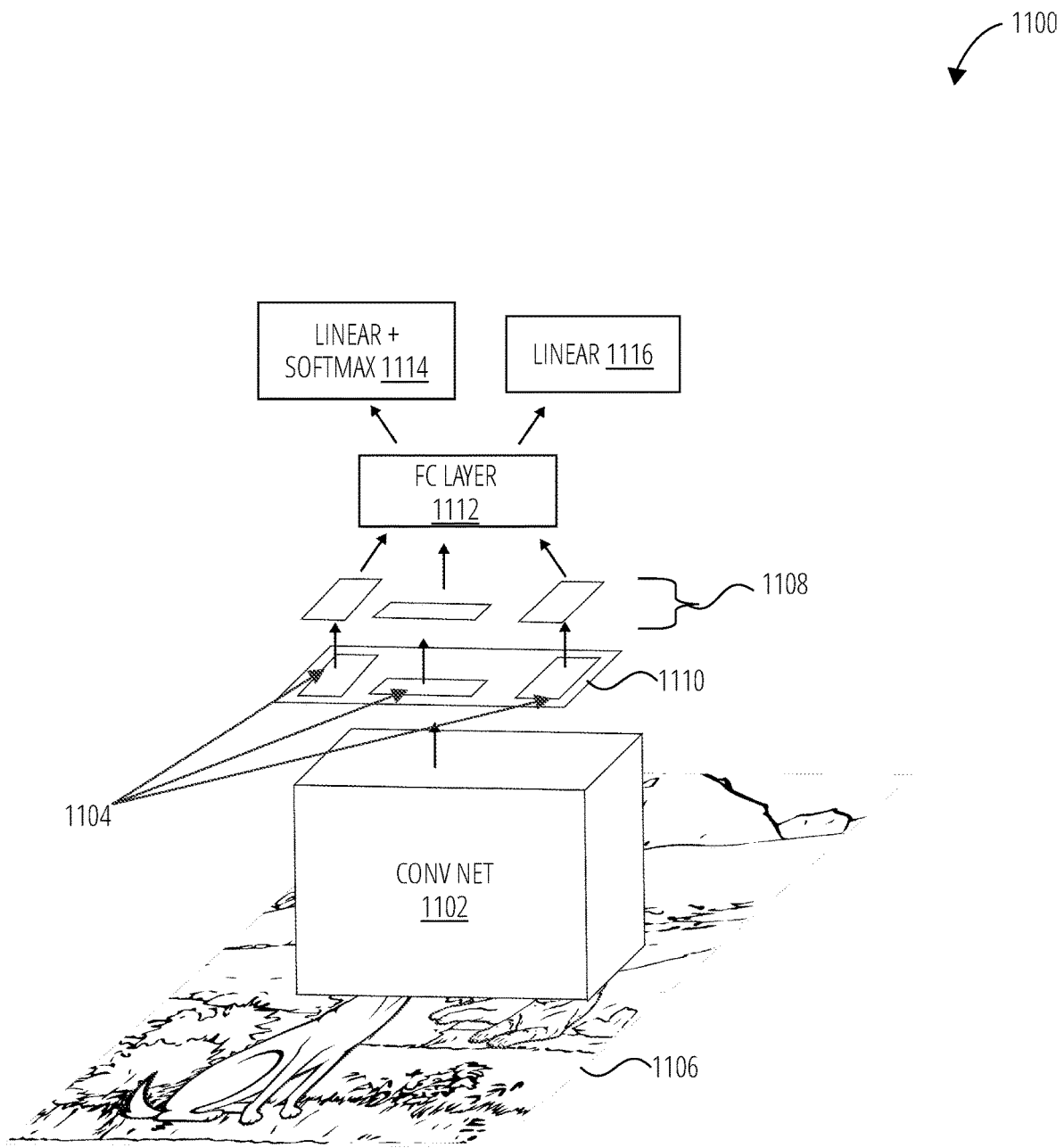
FIG. 11 illustrates a Fast Region-based Convolutional Network 1100.

FIG. 11 illustrates an example of a Fast Region-based Convolutional Network 1100 (Fast R-CNN). The entire image (input image 1106) feeds a CNN model (convolutional neural network 1102) to detect RoI (ROI 1104) on the feature maps 1110. Each region is separated using a RoI pooling layer (ROI pooling layer 1108) and it feeds fully connected layers 1112. This vector is used by a softmax classifier 1114 to detect the object and by a bounding box linear regressors 1116 to modify the coordinates of the bounding box. The purpose of the Fast R-CNN is to reduce the time consumption related to the high number of models necessary to analyse all region proposals.

A main CNN with multiple convolutional layers is taking the entire image as input instead of using a CNN for each region proposals (R-CNN). Region of Interests (RoIs) are detected with the selective search method applied on the produced feature maps. Formally, the feature maps size is reduced using a RoI pooling layer to get valid Region of Interests with fixed height and width as hyperparameters. Each RoI layer feeds fully-connected layers creating a features vector. The vector is used to predict the observed object with a softmax classifier and to adapt bounding box localizations with a linear regressor.

Figure 12:
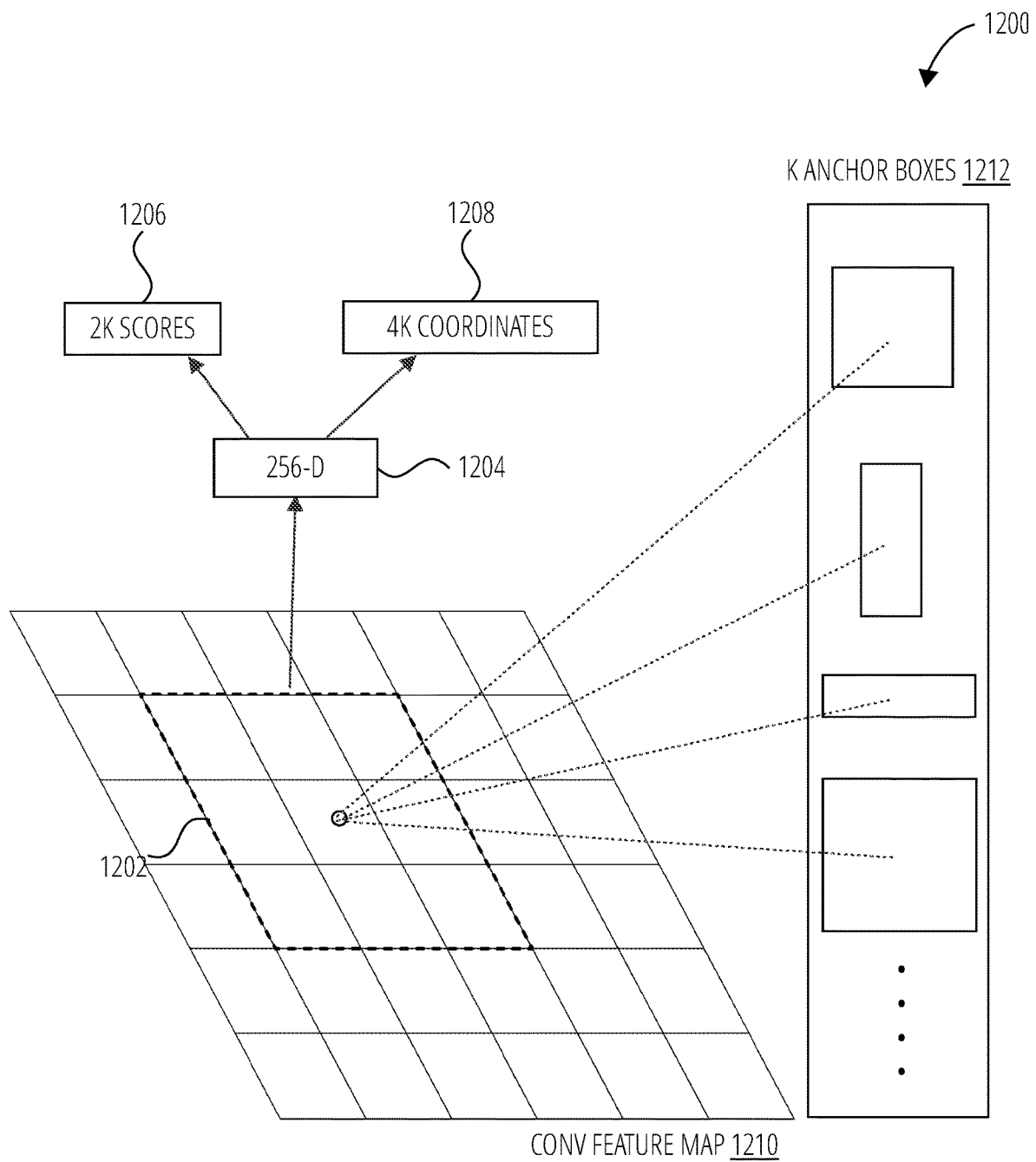
FIG. 12 illustrates a Faster Region-based Convolutional Network 1200.

FIG. 12 illustrates an example of a Faster Region-based Convolutional Network 1200 (Faster R-CNN).

Region proposals detected with the selective search method were still necessary in the previous model, which is computationally expensive. Region Proposal Network (RPN) was introduced to directly generate region proposals, predict bounding boxes and detect objects. The Faster R-CNN is a combination between the RPN and the Fast R-CNN model.

A CNN model takes as input the entire image and produces feature map 1210. A window of size 3×3 (sliding window 1202) slides all the feature maps and outputs a features vector (intermediate layer 1204) linked to two fully-connected layers, one for box-regression and one for box-classification. Multiple region proposals are predicted by the fully-connected layers. A maximum of k regions is fixed thus the output of the box regression layer 1208 has a size of 4 k (coordinates of the boxes, their height and width) and the output of the box classification layer 1206 a size of 2 k ("objectness" scores to detect an object or not in the box). The k region proposals detected by the sliding window are called anchors.

When the anchor boxes 1212 are detected, they are selected by applying a threshold over the "objectness" score to keep only the relevant boxes. These anchor boxes and the feature maps computed by the initial CNN model feeds a Fast R-CNN model.

The entire image feeds a CNN model to produce anchor boxes as region proposals with a confidence to contain an object. A Fast R-CNN is used taking as inputs the feature maps and the region proposals. For each box, it produces probabilities to detect each object and correction over the location of the box.

Faster R-CNN uses RPN to avoid the selective search method, it accelerates the training and testing processes, and improve the performances. The RPN uses a pre-trained model over the ImageNet dataset for classification and it is fine-tuned on the PASCAL VOC dataset. Then the generated region proposals with anchor boxes are used to train the Fast R-CNN. This process is iterative.

Figure 13:
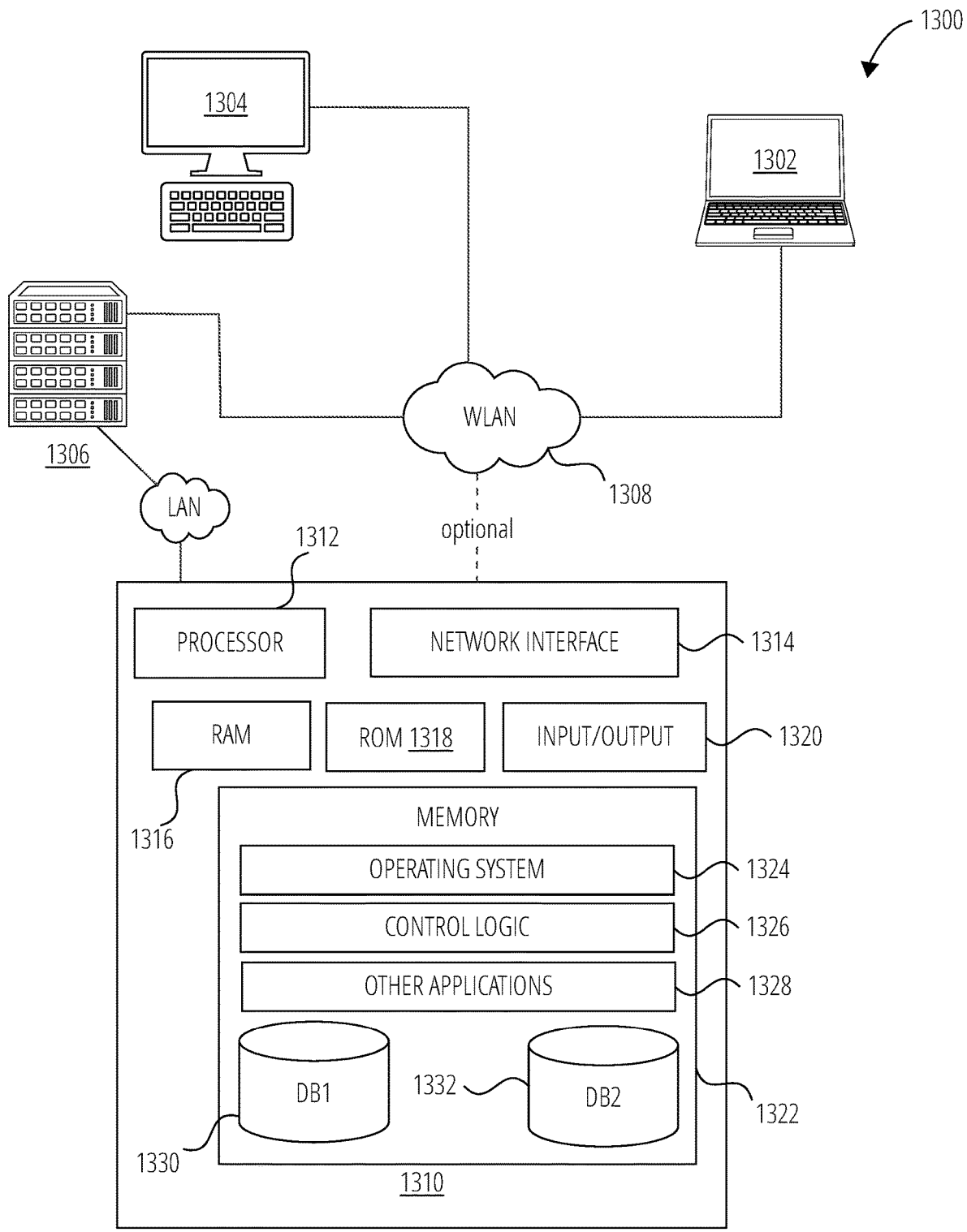
FIG. 13 depicts an illustrative computer system architecture 1300 that may be used in accordance with one or more illustrative aspects described herein.

FIG. 13 illustrates one example of a system architecture and data processing device that may be used to implement one or more illustrative aspects described herein in a stand-alone and/or networked environment. Various network nodes including data server 1310, web server 1306, computer 1304, and laptop 1302 may be interconnected via a wide area network 1308 (WAN), such as the internet. Other networks may also or alternatively be used, including private intranets, corporate networks, LANs, metropolitan area networks (MANs) wireless networks, personal networks (PANs), and the like. Network 1308 is for illustration purposes and may be replaced with fewer or additional computer networks. A local area network (LAN) may have one or more of any known LAN topology and may use one or more of a variety of different protocols, such as ethernet. Devices including data server 1310, web server 1306, computer 1304, laptop 1302 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network,"

which is comprised of the data—attributable to a single entity—which resides across all physical networks.

The components of the illustrative computer system architecture 1300 may include data server 1310, web server 1306, and client computer 1304, laptop 1302. Data server 1310 provides overall access, control and administration of databases and control software for performing one or more illustrative aspects described herein. Data server 1310 may be connected to web server 1306 through which users interact with and obtain data as requested. Alternatively, data server 1310 may act as a web server itself and be directly connected to the internet. Data server 1310 may be connected to web server 1306 through the network 1308 (e.g., the internet), via direct or indirect connection, or via some other network. Users may interact with the data server 1310 using remote computer 1304, laptop 1302, e.g., using a web browser to connect to the data server 1310 via one or more externally exposed web sites hosted by web server 1306. Client computer 1304, laptop 1302 may be used in concert with data server 1310 to access data stored therein, or may be used for other purposes. For example, from client computer 1304, a user may access web server 1306 using an internet browser, as is known in the art, or by executing a software application that communicates with web server 1306 and/or data server 1310 over a computer network (such as the internet).

Servers and applications may be combined on the same physical machines, and retain separate virtual or logical addresses, or may reside on separate physical machines. FIG. 13 illustrates just one example of a network architecture that may be used, and those of skill in the art will appreciate that the specific network architecture and data processing devices used may vary, and are secondary to the functionality that they provide, as further described herein. For example, services provided by web server 1306 and data server 1310 may be combined on a single server.

Each component including data server 1310, web server 1306, computer 1304, laptop 1302 may be any type of known computer, server, or data processing device. Data server 1310, e.g., may include a processor 1312 controlling overall operation of the data server 1310. Data server 1310 may further include RAM 1316, ROM 1318, network interface 1314, input/output interfaces 1320 (e.g., keyboard, mouse, display, printer, etc.), and memory 1322. Input/output interfaces 1320 may include a variety of interface units and drives for reading, writing, displaying, and/or printing data or files. Memory 1322 may further store operating system software 1324 for controlling overall operation of the data server 1310, control logic 1326 for instructing data server 1310 to perform aspects described herein, and other application software 1328 providing secondary, support, and/or other functionality which may or may not be used in conjunction with aspects described herein. The control logic may also be referred to herein as the data server software control logic 1326. Functionality of the data server software may refer to operations or decisions made automatically based on rules coded into the control logic, made manually by a user providing input into the system, and/or a combination of automatic processing based on user input (e.g., queries, data updates, etc.).

Memory 1322 may also store data used in performance of one or more aspects described herein, including a first database 1332 and a second database 1330. In some embodiments, the first database may include the second database (e.g., as a separate table, report, etc.). That is, the information can be stored in a single database, or separated into different logical, virtual, or physical databases, depending on system design. Web server 1306, computer 1304, laptop 1302 may have similar or different architecture as described with respect to data server 1310. Those of skill in the art will appreciate that the functionality of data server 1310 (or web server 1306, computer 1304, laptop 1302) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Implementations and Terminology

Terms used herein should be accorded their ordinary meaning in the relevant arts, or the meaning indicated by their use in context, but if an express definition is provided, that meaning controls.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Region-Based Fully Convolutional Network (R-FCN)

Fast and Faster R-CNN methodologies consist in detecting region proposals and recognize an object in each region. The Region-based Fully Convolutional Network (R-FCN) is a model with only convolutional layers allowing complete backpropagation for training and inference. The method merged the two basic steps in a single model to take into account simultaneously the object detection (location invariant) and its position (location variant).

A ResNet-101 model takes the initial image as input. The last layer outputs feature maps, each one is specialized in the detection of a category at some location. For example, one feature map is specialized in the detection of a cat, another one in a banana and so on. Such feature maps are called position-sensitive score maps because they take into account the spatial localization of a particular object. It consists of $k*k*(C+1)$ score maps where k is the size of the score map, and C the number of classes. All these maps form the score bank. Basically, we create patches that can recognize part of an object. For example, for k=3, we can recognize 3×3 parts of an object.

In parallel, the method runs a RPN to generate Region of Interest (RoI). Finally, the method cuts each RoI in bins and checks them against the score bank. If enough of these parts are activated, then the patch vote 'yes', I recognized the object.

You Only Look Once (YOLO)

The YOLO model directly predicts bounding boxes and class probabilities with a single network in a single evaluation. The simplicity of the YOLO model allows real-time predictions.

Initially, the model takes an image as input. It divides it into an S×S grid. Each cell of this grid predicts B bounding boxes with a confidence score. This confidence is simply the probability to detect the object multiply by the IoU between the predicted and the ground truth boxes.

The CNN used is inspired by the GoogLeNet model introducing the inception modules. The network has 24 convolutional layers followed by 2 fully-connected layers. Reduction layers with 1×1 filters[4] followed by 3×3 convolutional layers replace the initial inception modules. The Fast YOLO model is a lighter version with only 9 convolutional layers and fewer number of filters. Most of the convolutional layers are pretrained using the ImageNet dataset with classification. Four convolutional layers followed by two fully-connected layers are added to the previous network and it is entirely retrained with the PASCAL VOC datasets.

The final layer outputs a S*S*(C+B*5) tensor corresponding to the predictions for each cell of the grid. C is the number of estimated probabilities for each class. B is the fixed number of anchor boxes per cell, each of these boxes being related to 4 coordinates (coordinates of the center of the box, width and height) and a confidence value.

With the previous models, the predicted bounding boxes often contained an object. The YOLO model however predicts a high number of bounding boxes. Thus there are a lot of bounding boxes without any object. The Non-Maximum Suppression (NMS) method is applied at the end of the network. It consists in merging highly-overlapping bounding boxes of a same object into a single one.

Single-Shot Detector (SSD)

A Single-Shot Detector (SSD) model predicts all at once the bounding boxes and the class probabilities with an end-to-end CNN architecture.

The model takes an image as the input which passes through multiple convolutional layers with different sizes of filter (10×10, 5×5 and 3×3). Feature maps from convolutional layers at different position of the network are used to predict the bounding boxes. They are processed by a specific convolutional layers with 3×3 filters called extra feature layers to produce a set of bounding boxes similar to the anchor boxes of the Fast R-CNN.

Each box has 4 parameters: the coordinates of the center, the width and the height. At the same time, it produces a vector of probabilities corresponding to the confidence over each class of object.

The Non-Maximum Suppression method is also used at the end of the SSD model to keep the most relevant bounding boxes. The Hard Negative Mining (HNM) is then used because a lot of negative boxes are still predicted. It consists in selecting only a subpart of these boxes during the training. The boxes are ordered by confidence and the top is selected depending on the ratio between the negative and the positive which is at most 1/3.

Neural Architecture Search Net (NASNet)

The Neural Architecture Search consists in learning the architecture of a model to optimize the number of layers while improving the accuracy over a given dataset.

The NASNet network has an architecture learned from the CIFAR-10 dataset and is trained with the ImageNet dataset. This model is used for feature maps generation and is stacked into the Faster R-CNN pipeline. Then the entire pipeline is retrained with the COCO dataset.

Mask Region-Based Convolutional Network (Mask R-CNN)

Another extension of the Faster R-CNN model adds a parallel branch to the bounding box detection in order to predict object mask. The mask of an object is its segmentation by pixel in an image. This model outperforms the state-of-the-art in the four COCO challenges: the instance segmentation, the bounding box detection, the object detection and the key point detection.

The Mask Region-based Convolutional Network (Mask R-CNN) uses the Faster R-CNN pipeline with three output branches for each candidate object: a class label, a bounding box offset and the object mask. It uses Region Proposal Network (RPN) to generate bounding box proposals and produces the three outputs at the same time for each Region of Interest (RoI).

The initial RoIPool layer used in the Faster R-CNN is replaced by a RoIAlign layer. It removes the quantization of the coordinates of the original RoI and computes the exact values of the locations. The RoIAlign layer provides scale-equivariance and translation-equivariance with the region proposals.

The model takes an image as input and feeds a ResNeXt network with 101 layers. This model looks like a ResNet but each residual block is cut into lighter transformations which are aggregated to add sparsity in the block. The model detects RoIs which are processed using a RoIAlign layer. One branch of the network is linked to a fully-connected layer to compute the coordinates of the bounding boxes and the probabilities associated to the objects. The other branch is linked to two convolutional layers, the last one computes the mask of the detected object.

Three loss functions associated to each task to solve are summed. This sum is minimized and produces great performances because solving the segmentation task improve the localization and thus the classification.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method for rendering images, the method comprising:
receiving, from a user interface, a request from a user to access an image effect renderer recipe from an effect repository;
receiving at least one image signal;
identifying objects within the at least one image signal;
processing the image effect renderer recipe via an effect renderer recipe interpreter in order to generate image processing steps and image processing prioritizations;
ordering the image processing steps in accordance with the image processing prioritizations;

applying the image processing steps to the identified objects with the at least one image signal to generate at least one processed image signal through operation of an image processor; and displaying the at least one processed image signal on a display device, wherein the image effect renderer recipe comprises conditional logic and non-visual image data.

2. The method of claim 1, wherein the image effect renderer recipe includes instructions for at least one of overlays, segmentation, style transfer, coloring, procedural texture, and combinations thereof.

3. The method of claim 1, wherein the image effect renderer recipe is applied to the at least one image signal using an effect consumer application on a user device.

4. The method of claim 1, further comprising uploading the image effect renderer recipe to the effect repository by an effect creator.

5. The method of claim 1, wherein the effect repository is searchable by the user using an effect consumer application.

6. The method of claim 1, further comprising:
storing the image processing steps, ordered in accordance with the image processing prioritizations, as a platform-neutral graph, the platform-neutral graph comprising at least two nodes and at least one edge connecting the at least two nodes;
wherein the at least two nodes comprise at least one of image location data and image transformation data; and
wherein the at least one edge comprises a directional flow of the image signal between the at least two nodes.

7. The method of claim 6, wherein the image location data comprises at least one of an image signal input location, procedural texture input location, and image signal output location.

8. The method of claim 6, the image transformation data comprising a filter, wherein the filter provides instructions for transforming the image location data received by the filter.

9. The method of claim 6, the image transformation data comprising a mask, wherein the mask provides instructions for excluding a portion of the image location data received by the mask from the image location data transmitted by the mask.

10. The method of claim 6, the image transformation data comprising a merge, wherein the merge provides instructions for combining at least two received sets of image location data into a single transmitted set of image location data.

11. The method of claim 6, further comprising:
completing at least two of the image processing steps by traversing the platform-neutral graph using a render pass;
wherein the render pass follows the edges between at least two of the nodes beginning at a first set of image location data and ending at a second set of image location data; and
wherein the render pass progresses in one direction without branching or returning to a previous node.

12. The method of claim 11, further comprising:
completing additional render passes until all of the nodes in the platform-neutral graph are traversed at least once.

13. The method of claim 12, wherein multiple render passes are performed according to a render pass order.

14. The method of claim 13, further comprising:
determining the render pass order, wherein the render pass order minimizes the number of the render passes traversed in completing the image processing steps.

15. The method of claim 13, further comprising:
determining the render pass order, wherein the render pass order minimizes loss of the image signal in completing the image processing steps.

16. An image rendering system comprising:
an effect repository comprising image effect renderer recipes;
an effect consumer application comprising first logic allowing a user to access to the image effect renderer recipes and second logic to process the image effect renderer recipes;
a processor; and
a memory storing instructions that, when executed by the processor, configure an apparatus to:
receive, from a user interface, a request from the user to access the image effect renderer recipe from an effect database in the effect repository;
receive at least one image signal;
identify objects within the at least one image signal;
process the image effect renderer recipe via an effect renderer recipe interpreter in order to generate image processing steps and image processing prioritizations;
order the image processing steps in accordance with the image processing prioritizations;
apply the image processing steps to the identified objects with the at least one image signal to generate at least one processed image signal through operation of an image processor; and
display the at least one processed image signal on a display device,
wherein the image effect renderer recipe comprises conditional logic and non-visual image data.

17. The image rendering system of claim 16, wherein the image effect renderer recipe includes instructions for at least one of overlays, segmentation, style transfer, coloring, procedural texture, and combinations thereof.

18. The image rendering system of claim 16, wherein the image effect renderer recipes in the effect repository are encrypted and the effect consumer application decrypts the image effect renderer recipes before processing the image effect renderer recipes.

19. The image rendering system of claim 16, further comprising an effect creator application and a creator web portal, the effect creator application comprising third logic allowing an effect creator to encrypt, upload, and retrieve creator accessible image effect renderer recipes through the creator web portal to the effect repository, and fourth logic to process the creator accessible image effect renderer recipes.

20. The image rendering system of claim 19, further comprising fifth logic to publish the creator accessible image effect renderer recipes as the image effect renderer recipes such that they may be accessed through the effect consumer application.

* * * * *